A. S. Galliher.

Churn.

No. 87,657.  Patented Mar. 9, 1869.

Witnesses:  Inventor:
Rich'm Farley  A. S. Galliher.
A. C. Klink  By his Atty J. F. Reigart.

United States Patent Office.

A. S. GALLIHER, OF BRISTOL, TENNESSEE.

Letters Patent No. 87,657, dated March 9, 1869.

IMPROVEMENT IN CHURNS.

The Schedule referred to in these Letters Patent and making part of the same.

*To all whom it may concern:*

Be it known that I, A. S. GALLIHER, of Bristol, Sullivan county, State of Tennessee, have invented an Improved Churn; and I do hereby declare the following to be an exact description thereof, reference being had to the accompanying drawings, and to the letters of reference marked thereon, making a part of this specification, in which—

Figure 1:
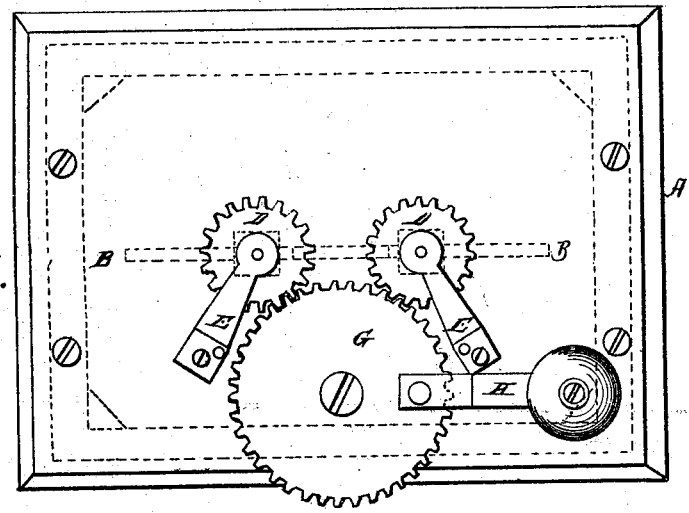

Figure 1 represents a top view, and

Figure 2:
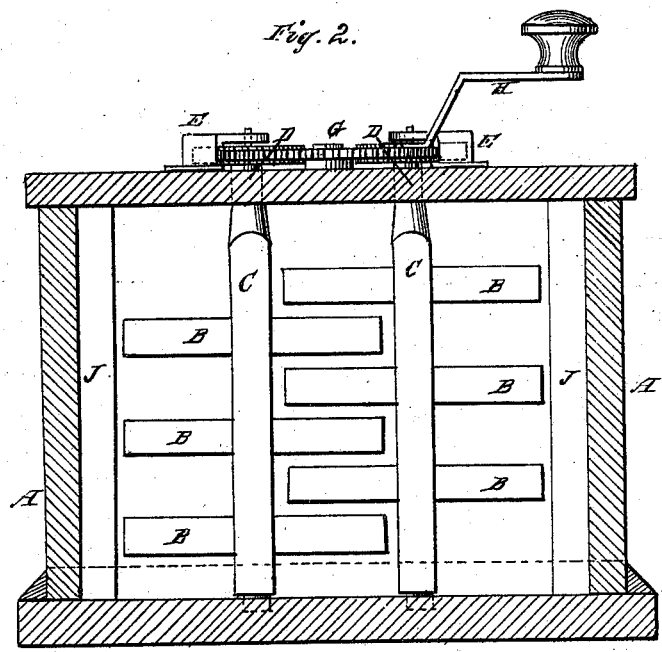

Figure 2, a vertical section of the churn.

A represents a square box, containing the churning devices.

B B B are the beaters, that are horizontal strips of equal length, extending through and on each side of two upright shafts, C c, and operating between each other, the shafts C operating on pivot-points in the bottom of the box, and their upper ends extending through the top, with a pinion, D, on each shaft, and the journals of the shafts C, revolving in boxes, E E, at top.

The pinions D D are driven by a main toothed wheel, G, that is operated by a crank, H, at top of the churn.

J are four upright stationary breakers, or beaters, located at the corners or sides of the box A.

The nature of my invention consists in the double-acting horizontal beaters, operating on upright shafts, propelled by the pinions and toothed wheel at top, and worked by the crank at top, and the object is to secure an easier working of the churn at the top of the churn, and a decided advantage over a side operation, both in breaking the cream and collecting the butter, as the cream is always working out and running down the outside of the churn, when the beaters are operated from the side, and a great annoyance to the operator.

I am aware that double-acting beaters are used and operated from the side of a churn, but these I do not claim.

I do not claim any upright bevel-gearing, as that has been used before; but

What I claim as my invention, and desire to secure by Letters Patent, is—

The arrangement of the horizontal triple gearing D D, and G, with the top braces E E, stationary beaters J J, and double-acting beaters B B, when constructed and operating as herein described, and for the purposes set forth.

A. S. GALLIHER.

Witnesses:
R. A. CARMACK,
J. B. PALMER.